Feb. 6, 1951 — T. H. FENGLER — 2,540,434
HOSE REEL
Filed May 16, 1949
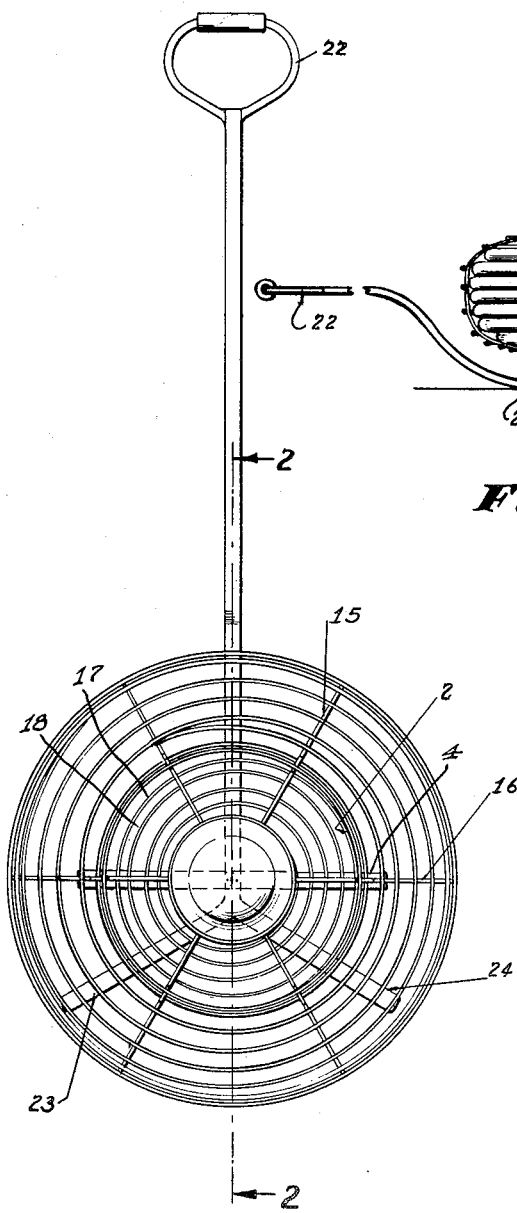
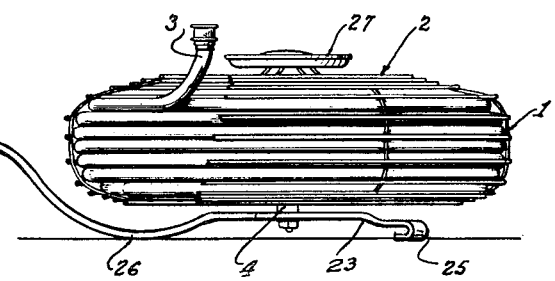
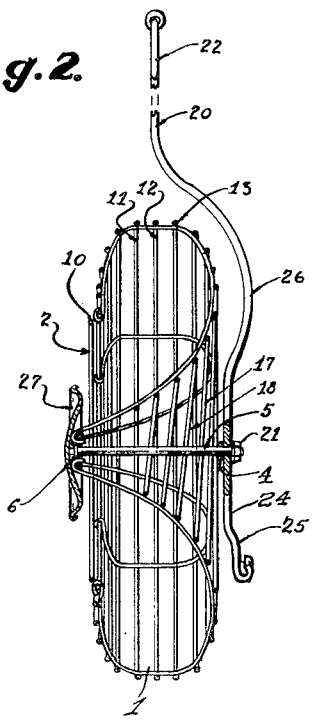
INVENTOR:
T. H. Fengler
BY O. O. Martin,
ATTORNEY Patented Feb. 6, 1951

2,540,434

UNITED STATES PATENT OFFICE 2,540,434

HOSE REEL

Theodore H. Fengler, Sherman Oaks, Calif.

Application May 16, 1949, Serial No. 93,439

7 Claims. (Cl. 242—87)

The present invention relates to a garden hose reel and has for its object to provide a hose reel of very simple and inexpensive construction. It is a further object of the invention to provide a reel into which a garden hose may be fed and from which the hose may be withdrawn with very little effort. Another object is to provide a hose reel within which a garden hose may be firmly held and moved from place to place without appreciable effort and which, when not in use, may be stored away within a very limited space or held suspended from a wall or any other suitable support.

These and the further objects of the invention, together with the many advantageous features thereof, will be better understood from the following detailed description particularly when reference is had to the accompanying drawings, of which:

Fig. 1 is a front elevational view of a hose reel embodying the invention;

Fig. 2 is a substantially corresponding end view of the device; and

Fig. 3 shows the reel resting on the ground in the most advantageous position for insertion of a garden hose and for removal of the hose from the reel.

As illustrated in the drawings, the reel is shaped to resemble an ordinary automobile tire having a somewhat flattened tread 1 and provided at one side thereof with an opening 2 for insertion or removal of a garden hose, such as indicated at 3. To the opposite side of the reel is secured a brace 4 which extends from the center of the wheel radially in both directions along the side thereof and the ends of the brace are fastened to the side of the wheel in any suitable manner as by a welding operation. A stud 5 is rotatably seated in this cross-brace and it extends axially through the wheel to a circular head 6, in which it is rotatably secured.

The reel is, in the preferred form shown in the drawings, made from wire which is combined to form an open mesh structure including a multiplicity of annular members, such as indicated at 10, 11, etc. which members combine to form the tread and sides of the wheel, and these annular members are held rigidly combined by means of a series of radially extending equidistantly spaced spoke-like wires 15, 16, etc. Each of these spokes extends from the annular member 10, which defines the front opening 2 of the reel, around the tread of the reel to the opposite side thereof, from which point each spoke extends inwardly and forwardly on a continuous curve to the head 6 to form a cone defining the garden hose storage space within the reel. The ends of the spokes are shown bent to form hooks engaging perforations of the head 6 and these hooks are rigidly secured in position in the head in any suitable manner, as by welding operation. It is also important to note that additional annular members 17, 18, etc. are provided rigidly to tie the inner ends of the spokes together.

The rear end of the stem 5 extends through the brace 4 to support an operating handle 20 which is held rigidly in position on the stem, as by a threaded nut 21. The handle is at the outer end thereof shown fitted with a hand-grip 22 by means of which the reel may be rolled along the ground without any particular effort. In order to properly balance the reel during such perambulating movement it is necessary to bend the handle inwardly, following the curvature of the reel, and to extend the outer end of the handle radially in a plane vertically through the center of the wheel, as indicated in Fig. 2.

When it is desired to place a garden hose within the reel, it is merely required to bring the structure to rest in the position indicated in Fig. 3, whereupon the end of the hose may be entered into the reel through the opening 2 and fed thereinto by merely pushing the hose forward, during which movement it is found that the reel will commence to rotate and to cause the hose to become evenly coiled within the reel against the inner surface thereof. Similarly, when it is desired to withdraw the hose from the reel, it is merely required to pull on the end thereof, causing the reel to rotate during this withdrawal movement and so to permit the hose to leave the reel without any danger of kinking or otherwise interfering with the removal thereof.

The handle 20 is, in order to form a good support for the reel when it is placed on the ground in Fig. 3 shown extended beyond the pivotal point thereof to provide arms 23, 24, which are substantially radially directed in such a fashion that a triangular base is formed for the reel. It is important to note that the outer ends of these arms are bent away from the side of the reel a short distance, substantially as indicated at 25, and that the intermediate curved portion 26 of the handle is similarly withdrawn a short distance from the side of the reel. When the handle is so shaped, it is found that the reel will have ample clearance for rotation on the stem 5, even when placed on uneven ground.

For the purpose of guiding the hose during insertions and removals thereof, it is found desirable to place a circular disc 27 on the head 6 of a size to cover the center portion of the opening 2 and so as to leave merely sufficient space for insertion and removal of the hose which, during these operations, is held guided below the rounded inner edge of the disc and will not slip over the edge thereof. When the reel is tipped into the perambulating position of Fig. 2, it is found that the coils of the hose come to rest against the inner surface of the reel to maintain the hose securely in position therein. However, should it be desired more securely to lock the hose in this position, it merely required to slip the end of the hose into one of the spaces between the spokes directly below the head 6.

As indicated in the drawings, the outer contour of the reel is defined by the seperate annular member 11—13. It may, however, be found more convenient to form the reel from a single length of wire which is coiled into the required shape. Illustrative of this method of construction I have, in Fig. 2, shown the inner, conoidal portion of the reel composed of a single length of wire, the coils 17, 18 of which rise a distance from the rear surface of the reel. Or the reel may, if preferred, be made from sheet material which is bent into the shape substantially as shown and which will form a solid, walled enclosure for the hose. Other modifications may be embodied within the scope of the claims hereto appended.

I claim:

1. A hose reel the contour of which resembles an automobile tire, the reel having in each side thereof a relatively large coaxial circular opening, the material of the reel being extended inwardly from the rear side opening on a continuous curve to form a conoidal inner wall projecting through the front side opening of the reel, a head on the projecting end of said inner wall, a brace spanning said rear side opening, a stem axially extending through the reel and rotatably supported in said head and brace, and a handle rigidly secured to the rear end of said stem.

2. A hose reel the contour of which resembles an automobile tire, the reel having in each side thereof a relatively large coaxial circular opening, the material of the reel being extended inwardly from the rear side opening on a continuous curve to form a conoidal inner wall projecting through the front side opening of the reel, a head on the projecting end of said inner wall, a somewhat larger circular disc on said head, a brace spanning said rear side opening, a stem axially extending through the reel and rotatably supported in said head and brace, and a handle rigidly secured to the rear end of said stem.

3. A hose reel the contour of which resembles an automobile tire, the reel having in each side thereof a relatively large coaxial circular opening, the material of the reel being extended inwardly from the rear side opening on a continuous curve to form a conoidal inner wall projecting through the front side opening of the reel, a head on the projecting end of said inner wall, a brace spanning said rear side opening, a stem axially extending through the reel and rotatably supported in said head and brace, and a handle rigidly secured to the rear end of said stem, said handle having arms radially extending from the pivotal center thereof to form with the handle a stand on which the reel is rotatably supported when tilted to rest the stand on the ground.

4. A hose reel the contour of which resembles an automobile tire, the reel having in each side thereof a relatively large coaxial circular opening, the material of the reel being extended inwardly from the rear side opening on a continuous curve to form a conoidal inner wall projecting through the front side opening of the reel, a head on the projecting end of said inner wall, a brace spanning said rear side opening a stem axially extending through the reel and rotatably supported in said head and brace, and a handle rigidly secured to the rear end of said stem, the handle being bent to follow the curvature of the rim of the reel and continuing in a plane through the center of the wheel perpendicular to said stem.

5. A hose reel the contour of which resembles an automobile tire, the reel having in each side thereof a relatively large coaxial circular opening, the material of the reel being extended inwardly from the rear side opening on a continuous curve to form a conoidal inner wall projecting through the front side opening of the reel, a head on the projecting end of said inner wall, a brace spanning said rear side opening, a stem axially extending through the reel and rotatably supported in said head and brace, and a handle rigidly secured to the rear end of said stem, said handle having arms radially extending from the pivotal center thereof to form with the handle a stand on which the reel is rotatably supported when tilted to rest the stand on the ground, the handle being bent to follow the curvature of the rim of the reel and continuing in a plane through the center of the wheel perpendicular to said stem.

6. A hose reel the contour of which resembles an automobile tire, the reel having in each side thereof a relatively large coaxial circular opening, the material of the reel being extended inwardly from the rear side opening on a continuous curve to form a conoidal inner wall projecting through the front side opening of the reel, a head on the projecting end of said inner wall, a brace spanning said rear side opening, a stem axially extending through the reel and rotatably supported in said head and brace, and a handle rigidly secured to the rear end of said stem, said handle having arms radially extending from the pivotal center thereof to form with the handle a stand on which the reel is rotatably supported when tilted to rest the stand on the ground, the handle being bent to follow the curvature of the rim of the reel and continuing in a plane through the center of the wheel perpendicular to said stem, the arms and the inner portion of the handle being offset rearwardly a distance further to elevate the reel from the ground when in this manner rotatably supported.

7. A hose reel consisting of a wire network of the general contour of an automobile tire having a relatively large circular opening in the front and rear side thereof, the wire of the network being coiled to follow the contour of the reel from the front side opening thereof around the tread of the wheel to the opening in the rear side thereof, the wire coil continuing from the rim of this opening inwardly to form a conoidal inner wall extending into the front side opening, a series of equidistantly spaced wire spokes interconnecting the coils of the wire netting, a stem axially extending through the reel for rotation therein, and a handle rigidly secured to the rear end of said stem.

THEODORE H. FENGLER.

REFERENCES CITED

The following references are of record in the file of this patent:

UNITED STATES PATENTS

| Number | Name | Date |
| --- | --- | --- |
| 2,300,243 | Zierden | Oct. 27, 1942 |
| 2,334,141 | Zierden | Nov. 9, 1943 |

FOREIGN PATENTS

| Number | Country | Date |
| --- | --- | --- |
| 546,734 | Great Britain | July 28, 1942 |